United States Patent [19]

Tanson

[11] Patent Number: 4,736,464
[45] Date of Patent: Apr. 5, 1988

[54] METHOD FOR THE ADDITIONAL TRANSMISSION OF INFORMATION VIA A DIGITAL AUXILIARY CHANNEL, IN AN OPTICAL TRANSMISSION SYSTEM

[75] Inventor: Patrick Tanson, Zürich, Switzerland

[73] Assignee: BBC Brown, Boveri & Company Limited, Baden, Switzerland

[21] Appl. No.: 780,307

[22] Filed: Sep. 26, 1985

[30] Foreign Application Priority Data

Sep. 28, 1984 [CH] Switzerland .................. 4669/84

[51] Int. Cl.$^4$ .............................................. H04B 9/00
[52] U.S. Cl. ............................. 455/608; 455/612
[58] Field of Search ............... 455/601, 612, 608, 613, 455/617; 375/10, 17; 340/347 DD; 370/110.1

[56] References Cited

U.S. PATENT DOCUMENTS

| | | | |
|---|---|---|---|
| 4,337,467 | 6/1982 | Tache | 340/347 DD |
| 4,449,247 | 5/1984 | Waschka | 455/9 |
| 4,524,462 | 6/1985 | Cottatelucci | 455/608 |
| 4,606,028 | 8/1986 | Wagenmakers | 371/49 |

OTHER PUBLICATIONS

Optical Line Codes Bearing Ancillary Channels, K. W. Cattermole and W. D. Grover, pp. 7/1 to 7/7.
Ein Lichtwellenleitersystem für, etc. Josef Fluhr et al. (1983), Electronic Letters, Jul. 31, 1980, vol. 16, No. 16.

Philips Telecommunication Review, vol. 40, No. 2, Jul. 1982, Optical Transmission Equipment.

*Primary Examiner*—Robert L. Griffin
*Assistant Examiner*—Leslie Van Beek
*Attorney, Agent, or Firm*—Oblon, Fisher, Spivak, McClelland & Maier

[57] ABSTRACT

A method for the additional transmission of information items via a digital auxiliary channel in an optical wave guide system for digital signal transmission, in which system electric signals, which are coded in a pseudo-ternary bipolar code, are converted into a redundant, binary line code and are transmitted in converted form via an optical wave guide. In each case one information unit of the information items is transmitted by modification of a selected bit pattern from the data stream present in line code. According to the method, the pseudo-ternary bipolar code is the HDB-3 code, the MCMI code is used as the line code, the bit sequences 110011 and 001100 are used as selected bit patterns and at least one of the bit sequences 011011, 100111 and 101101 is allocated as a modification to the bit sequence 110011, and at least one of the bit sequences 001001, 000110 and 010010 is allocated as a modification to the bit sequence 001100. The method is applied to the remote monitoring of an optical data transmission system including repeaters, which permits such monitoring to be implemented in an inexpensive and functionally reliable manner.

10 Claims, 3 Drawing Sheets

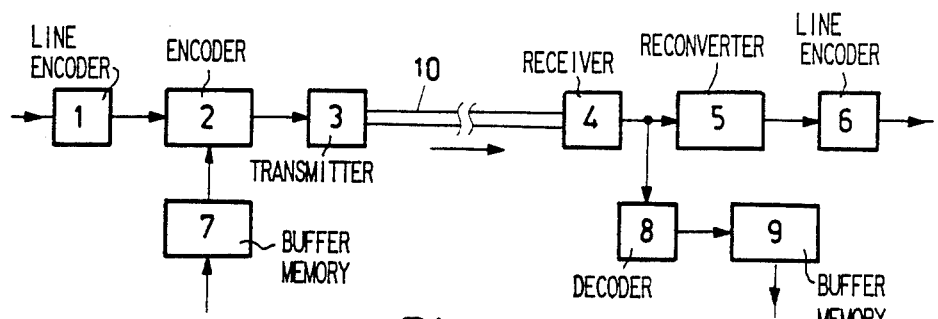
Fig. 1 PRIOR ART
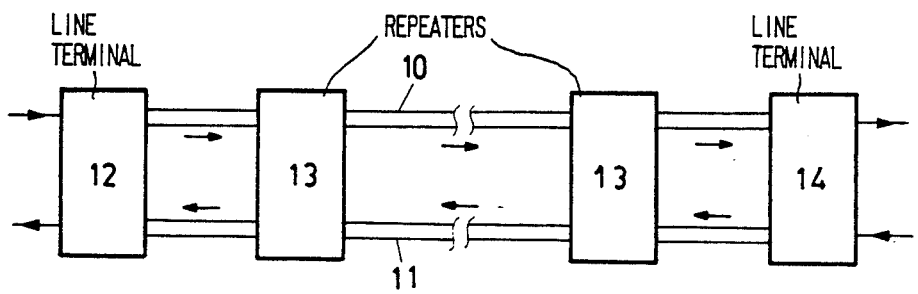
Fig. 2
Fig. 3

METHOD FOR THE ADDITIONAL TRANSMISSION OF INFORMATION VIA A DIGITAL AUXILIARY CHANNEL, IN AN OPTICAL TRANSMISSION SYSTEM

BACKGROUND OF THE INVENTION

1. Field of the Invention

The present invention relates to a method for the additional transmission of information via a digital auxiliary channel such as is known, for example, from the article "Optical Line Codes Bearing Ancillary Channels" by K. W. Cattermole and W. D. Grover, IEE Colloquium on Data Transmission Codes, London, November, 1980. The present invention also relates to such a method as applied to an optical transmission system as described in telcom report 6 (1983), supplement "message transmission by light", pages 127-132.

2. Discussion of Background

In the field of line-conducted digital signal transmission, for example of PCM transmission in telephone channels, the use of optical wave guides is becoming more and more significant because of the large band width becoming available by this means.

In this connection, the replacement of electrical conductors by optical wave guides initially refers to the main transmission path via which the data present are transmitted from one station to the next. But in addition to the main transmission path, auxiliary and service channels are also needed for controlling and monitoring the operation of the line network and, if necessary, to pass on instructions or alarm signals. In the conventional electrical coaxial line systems, such auxiliary channels are provided by additional pairs of lines in parallel with the coaxial lines.

Transferring this principle of the separately constructed auxiliary channels to the technology of optical wave guides leads either to combining an optical wave guide (main transmission path) with an electrical pair of lines, auxiliary channel) or to a plurality of optical wave guides having separate tasks.

Both solutions are costly because of the additional conductors needed. In the case of the first solution, the advantages of freedom from interference and of direct-current isolation of optical fibers are lost due to the use of the electrical pair of conductors. In the case of the second solution, channel capacity is wasted because only a fraction of the high transmission capacity of an optical wave guide is utilized due to the low signal rate in the service channel.

For these reasons, people have searched for some time for solutions in which, by taking special measures, the same optical wave guide can be used both as the main transmission path and as the auxiliary channel. Of these solutions, those are of particular interest in which the auxiliary channel can be used without interrupting the main transmission path. Thus, for example, it has been proposed to implement an independent auxiliary channel by transmitting the corresponding information by modulating the clock frequency (Electronics Letters 16 (16), July, 1980, pages 624-626).

Another proposal relates to analog transmission by amplitude or frequency modulation within a frequency range below the traffic band (Philips Telecommunication Review 40 (2), July, 1982, pages 79-86).

Such "analog" auxiliary channels, however, require elaborate signal processing (modulation, demodulation), necessitate changes and interventions at the optical transmitter and receiver and have a disadvantageous influence on the transmission quality in the main transmission path.

For these reasons, it has been proposed in the article by K. W. Cattermole and W. D. Grover initially mentioned, to utilize the redundancy of the line code, used in optical data transmission, for transmitting information in binary form by modifying selected bit patterns of the data stream in the main transmission path, in which arrangement one information unit is represented by the presence or absence of a modification ("digital" auxiliary channel).

As selected bit patterns (SOP: Signalling Opportunity Pattern), bit patterns are used which occur with sufficient frequency in the present data stream and can be converted in simple manner into modified bit patterns which do not occur in the original data stream and can thus be easily detected at the receiver side.

Starting with a transmission system at the electric interfaces of which the data are present in a pseudo-ternary bipolar code and in which these data are converted into the redundant, binary line code 2 AMI (Alternate Mark Inversion) for optical transmission, Cattermole and Grover specify as selected bit patterns (SOP) the sequences 1011 and 0100 which are associated with the sequences 1111 and 0000 as modified patterns.

The utility of the bit patterns specified is restricted to transmission systems in which the special codes are used which have been assumed.

A different optical wave guide system having a transmission rate of about 2 and 8 Mbits/s, as described in the printed supplement "message transmission by light", pages 127-132 of the telcom report 6 (1983), is based on interface signals which are coded in so-called HDB-3 code (High Density Bipolar) according to CCITT Recommendation G 703, Annex A, and are converted into the MCMI code (Modified Coded Mark Inversion) for optical transmission.

SUMMARY OF THE INVENTION

Since optical wave guide systems of the type last described play an increasingly important role for digital signal transmission but an additional transmission of information via a digital auxiliary channel for these systems has hitherto not been known, the present invention has the objective of specifying a method by means of which the concept of a digital auxiliary channel for optical wave guide systems can be realised, using HDB-3/MCMI code conversion.

In a method of the initially-mentioned type, the providing a novel method for the additional transmission of information items via a digital auxiliary channel in an optical wave guide system for digital signal transmission, in which system electric signals, which are coded in a pseudo-ternary bipolar code, are converted into a redundant, binary line code and are transmitted in converted form via an optical wave guide. In each case one information unit of the information items is transmitted by modification of a selected bit pattern from the data stream present in line code. According to the method, the pseudo-ternary bipolar code is the HDB-3 code, the MCMI code is used as the line code, the bit sequences 110011 and 001100 are used as selected bit patterns and at least one of the bit sequences 011011, 100111 and 10111 is allocated as a modification to the bit sequence 110011, and at least one of the bit sequences 001001, 000110 and 010010 is allocated as a modification to the bit sequence 001100.

The method according to the invention is characterised by the following advantages:

the unmodified bit patterns 110011 and 001100 occur relatively frequently (with a probability p=⅛ in the case of statistical data) so that the auxiliary channel has a sufficiently high capacity;

the corresponding modified bit patterns 011011, 100111, 101101, 001001, 000110 and 010010 are the shortest sequences which can again be unambiguously detected as modiciations in the MCMI-coded data stream without synchronization at the receiver side because they cannot occur in the original data stream;

the modifications do not produce any additional DC component because the ratio of "1" to "0" is not changed by the modifications;

the running digital sum (RDS) is not impaired by the modification so that bit error measuring the MCMI-coded data stream by means of the RDS is still possible; and in particular, the selected bit patterns also occur in the AIS (Alarm Indication Signal) established by the CCITT which corresponds to a continuous sequence of binary "1" so that the transmission in the auxiliary channel is ensured even during the transmission of an AIS.

The use of the method according to the invention in an optical wave guide system in which data are transmitted via two optical wave guides in two opposite directions by means of at least one repeater with interposition of an HDB-3-to-MCMI code conversion between two line terminals, provides for the respective digital auxiliary channels to be used for remote monitoring of the system and, particularly, of the repeaters.

This application also has considerable advantages:

in each direction, a "transparent" auxiliary channel for the telemetry data of the remote monitoring system exists which goes from line terminal through to line terminal and passes unimpeded through all repeaters like the main transmission path;

the telemetry data can be inserted into and extracted again from the MCMI-coded data stream in a simple manner by means of conventional digital circuits;

since the telemetry data are accommodated as modified bit patterns in the main data stream, no interference with the optical transmitters and receivers is necessary;

the digital auxiliary channel has no effects on the transmission quality in the main transmission path;

in the case of a failure of a repeater or interruption of an optical wave guide, the remote monitoring remains intact up to the last repeater before the fault location so that the fault can be unambiguously located;

if the data signal in the main transmission path fails, the AIS transmitted in that case can be used without difficulties as a carrier; and all assemblies can be produced as digital circuits.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of an optical transmission system, comprising a digital auxiliary channel according to the prior art;

FIG. 2 shows an example of a bit sequence with the bit patterns, in modified and unmodified form, used in the method according to the invention;

FIG. 3 is a block diagram of an optical wave guide system for digital signal transmission according to the prior art;

DESCRIPTION OF THE PREFERRED EMBODIMENTS

Figure 4:
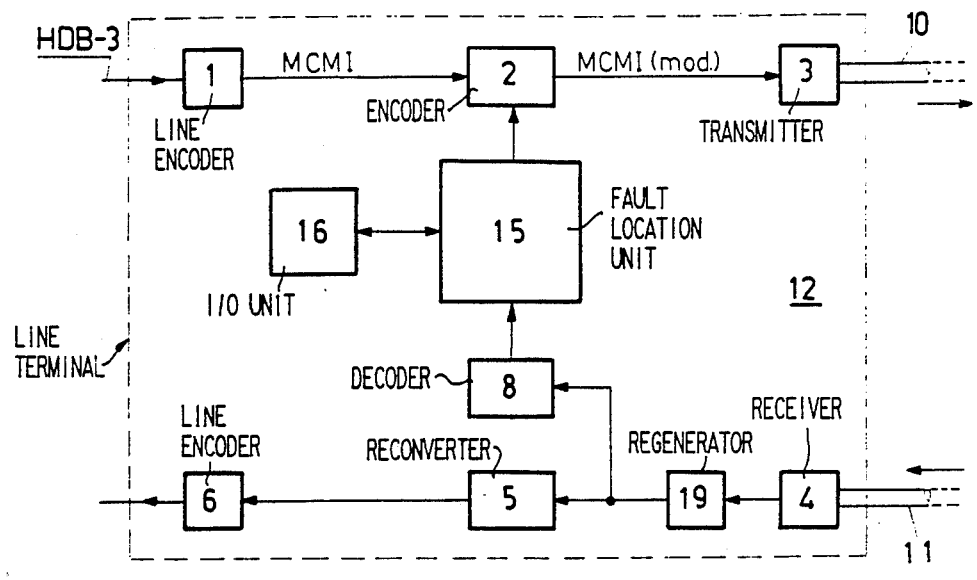
FIG. 4 is a block diagram of an illustrative embodiment of a first line terminal for the application of the method according to the invention.

Referring now to the drawings, wherein like reference numerals designate identical or corresponding parts throughout the several views, and more particularly to FIG. 1 thereof shows a block diagram of a known optical transmission system comprising a digital auxiliary channel. On the left-hand transmitter side of the system, available data present in a pseudo-ternary bipolar code are converted in a line encoder 1 into a redundant binary line code (for example AMI). The line-coded data stream passes via an additional encoder 2, the operation of which will be described in greater detail in the text following, to an optical transmitter 3 which converts the electric signals into optical signals and transmits them via an optical wave guide 10 to an optical receiver 4. Receiver 4 reconverts the optical signals into electric signals and passes them via a reconverter 5 to a line decoder 6 which carries out the re-conversion from the line code to the bipolar code.

The optical wave guide 10, the optical transmitter 3 and receiver 4 and the line encoder 1 and line decoder 6 form the main transmission path for the main data stream.

The consequence of the redundancy feature of the line code used is that certain bit patterns cannot occur in the data stream of the main transmission path. If, therefore, such a bit pattern is inserted into the data stream on the transmitter side by the additional encoder 2, it can be detected on the receiver side by means of an appropriate additional decoder 8 which continuously monitors the data stream.

If, in addition, a bit pattern of the same extent, which frequently occurs in the data stream, is selected and a bit pattern of the type described, which does not occur, is allocated to this selected bit pattern as a modification, a binary information item can be transferred by transmitting in the data stream, instead of the selected bit pattern, its associated modification.

In this manner, a digital auxiliary channel is implemented in known manner, which channel extends via the additional encoder 2, the optical transmitter 3 and receiver 4, the optical wave guide 10 and the additional decoder 8. To eliminate the possibility of effects of the modifications on the further processing of the data, the reconverter 5, which replaces each modification by the associated selected bit pattern of the original data stream, is suitably provided at the receiver side.

In addition, in each case one temporary memory 7 and 9 (data buffer) is suitably provided at the input and output of the digital auxiliary channel so that the data passing via the auxiliary channel can be temporarily stored and, when required, called up for transmission when one of the selected bit patterns, irregularly occurring in the data stream is present.

The method according to the invention is also based on a system of the type shown in FIG. 1. In contrast to the known method, however, a data stream coded in HDB-3 code, which is converted to an MCMI code for the optical transmission, is processed in this case.

The individual steps of this conversion can be explained with the aid of the table shown in FIG. 2, starting from an illustrative binary starting sequence.

In the top row of the table, a binary starting sequence of zeros and ones is shown which can be obtained, for example, as an excerpt from a PCM-coded speech signal. During the conversion to the HDB-3 code, this starting sequence leads to a sequence of three values of B+, B− and 0, shown in the next-lower row of the table. Further conversion from pseudo-ternary HDB-3 code to the MCMI line code allocates a sequence of two ones to each (B+) value, a sequence of two zeros to each (B−) value and a sequence of one zero and one one to each zero value. The resultant bit sequence with twice the bit rate and corresponding redundancy is shown in the third row of the table.

According to the invention, the two framed sequences 110011 and 001100, in each case corresponding to a sequence of three ones in the binary starting sequence, are then used as a the selected bit patterns of this MCMI-encoded data stream.

One of the three sequences 011011, 100111 and 101101 is optionally allocated to the one sequence 110011 and one of the sequences 001001, 000110 and 010010 is optionally allocated to the other sequence 001100 as modification. In the table of FIG. 2, the two bit patterns 011011 and 001001, for example, have been selected as modifications resulting in the modified data stream (MCMI (mod.)) in the bottom row of the table if the framed sequences are replaced by their modifications. If the other possible modifications are used, similar data streams will result.

The binary "1" of an information unit is then transmitted via the digital auxiliary channel by replacing, for example, a selected bit pattern of the 110011 type in the data stream by one of the three modifications mentioned. Correspondingly, the binary "0" is transmitted by replacing a selected bit pattern of the other type 001100 in the data stream by one of the three modifications allocated to it. Naturally, the roles of the bit patterns can also be interchanged so that the selected bit pattern 001100 and its modifications are allocated to the binary "1".

A preferred application of this transmission method by means of a digital auxiliary channel is found particularly in the remote monitoring of an optical transmission system as shown in FIG. 3.

Such a transmission system contains two line terminals 12 and 14 in which the incoming electric signals are converted into optical signals, and conversely. Between the two line terminals 12 and 14, the data streams are transmitted in opposite directions by two optical wave guides 10 and 11.

For compensating damping losses in the optical wave guides 10 and 11, one or several repeaters 13, which regenerate the data stream, are provided on the transmission path, depending on the distance between the line terminals 12 and 14. The method according to the invention is used for exchanging instructions and remote monitoring (telemetry) data between one of the line terminals 12 and 14 and the repeaters 13 and the other one of the line terminals via the digital auxiliary channels of the two optical wave guides 10 and 11 without having to interrupt the operation on the main transmission oath (so-called in-service or on-line monitoring).

According to a preferred illustrative embodiment, an address is allocated in each case to each repeater 13 and the line terminal to be monitored. If then, for example, the line terminal 12 is monitoring the operation of the remaining system, this monitoring line terminal 12 will successively call, by addressing, the repeaters 13 and the line terminal 14, to be monitored, via the digital auxiliary channel of the optical wave guide 10.

The functional unit called in each case then returns the appropriate telemetry data via the digital auxiliary channel of the second optical wave guide 11 to the monitoring line terminal 12. For continuous remote monitoring, this serial polling of the repeaters 13 and of the line terminal 14 to be monitored is cyclically repeated.

A block diagram of a preferred illustrative embodiment of the line terminal 12 designed for remote monitoring is shown in FIG. 4.

The data coming in HDB-3 code from an electric interface are converted inside line terminal 12 by the line encoder 1 into MCMI line code in a manner known per se and are converted into optical signals in the optical transmitter 3 and fed into the outgoing optical wave guide 10. The optical transmitter 3 contains, for example, a regulated laser diode which emits a light signal with constant swing. Technical details of such a transmitter can be found, for example, in the above-mentioned printed supplement "message transmission by light", pages 129 and following, of the telcom report 6 (1983).

Analogously, the optical signals produced by the incoming optical fiber 11 pass to the optical receiver 4 which, for example, is equipped with an avalanche photo diode (APD) and the technical design of which is also known from the above-mentioned printed document.

The pulse shape of the electric data signals generated by the optical receiver 4 is preferably regenerated in a subsequent regenerator circuit 19, after which the signals are reconverted from the MCMI line code to the HDB-3 code in the line decoder 6 and supplied to an electric interface, not shown, at the receiver.

To construct the two digital auxiliary channels for the remote monitoring system, an additional encoder 2 is arranged between the line encoder 1 and the optical transmitter 3 and a corresponding additional decoder 8 is arranged between the optical receiver 4 and the line decoder 6.

The additional encoder 2 is designed for modifying the selected bit patterns of the MCMI-encoded data stream as already described. For this purpose, for example, the incoming bit sequence of the data stream is shifted through a shift register and the register contents are compared at each clock cycle with the contents of two read-only memories in which the selected bit patterns 110011 and 001100 are stored.

When a binary "1" is to be transmitted via the digital auxiliary channel, one of the two selected bit patterns is replaced by one of its three modifications allocated in each case as soon as it has been detected in the data stream by the comparison.

If, in contrast, a binary "0" is to be transmitted, the other one of the two selected bit patterns is modified. In this manner, an information unit can be transmitted via the digital auxiliary channel whenever one of the selected bit patterns appears in the data stream.

The additional decoder 8 monitors the incoming modified MCMI data stream which contains both the selected bit patterns (with missing transmission) and the modifications, not normally occurring (if a binary "1" or "0" is transmitted), and detects these bit patterns.

For each modification of the one selected bit pattern detected, the additional decoder 8 outputs a "0" at its output and for each modification of the other bit pattern detected, correspondingly, a "1" so that the information items transmitted on the digital auxiliary channel are extracted again from the data stream.

The remote monitoring system is controlled by a fault location unit 15 (FLU) which is connected to an input and output unit (16). In the normal case, the fault location unit 15 cyclically and in a predetermined sequence (serially) requests all repeaters 13 and the opposite line terminal 14 by direct addressing via the digital auxiliary channel associated with the optical wave guide 10 to send the alarm signals and error messages occurring in the form of a message via the digital auxiliary channel associated with the optical wave guide 11 back to the fault location unit 15.

All repeaters 13 and the line terminal monitored monitor the MCMI data stream modified by the additional encoder 2 in the line terminal 12 and only respond when they detect their own address. The fault location unit 15 evaluates the messages extracted by the additional decoder 8 from the returning data stream and displays corresponding messages at the input and output unit 16.

Figure 5:
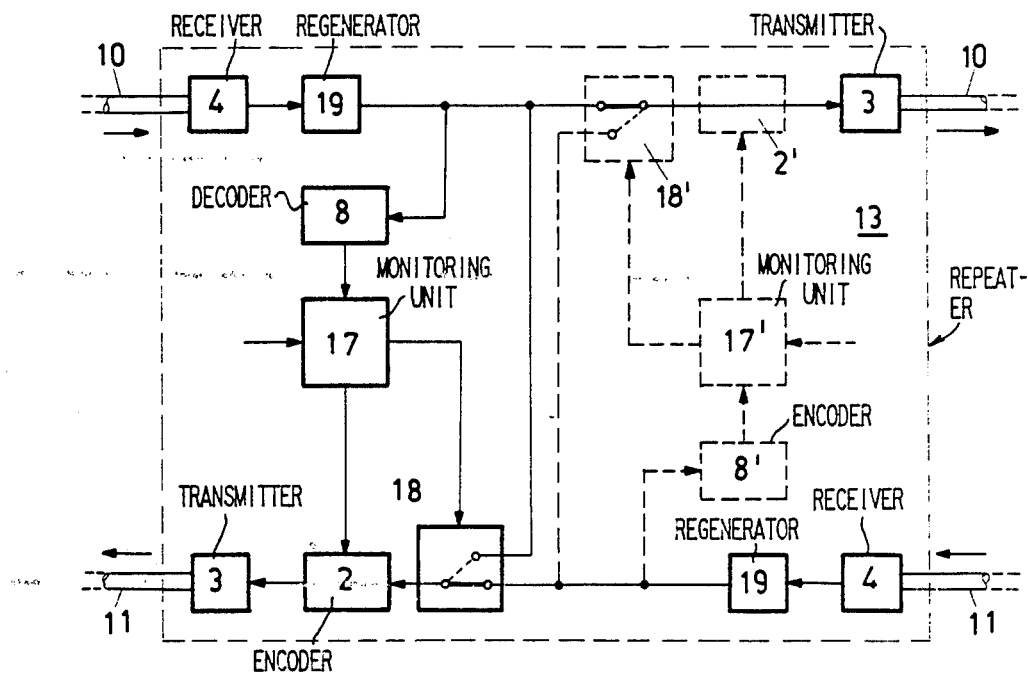
FIG. 5 is a block diagram of an illustrative embodiment of a corresponding repeater for application of the method according to the invention.
Figure 6:
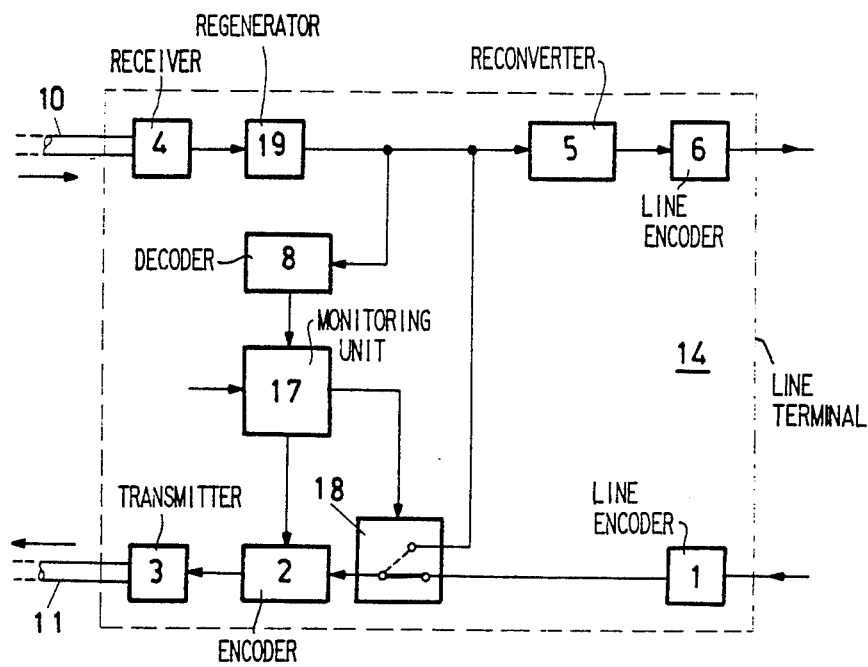
FIG. 6 is a block diagram of an illustrative embodiment of a second line terminal for application of the method according to the invention.

Illustrative embodiments of the repeaters 13 and of the line terminal 14 monitored are reproduced in the block diagram in FIGS. 5 and 6. In addition to the functional blocks of the optical transmitters 3, the optical receivers 4, the regenerator circuits 19, the additional encoder 2 and the additional decoder 8, the repeater 13 of FIG. 5 contains a monitoring unit 17.

The monitoring unit 17 collects the important operating data from the repeater 13. When the additional decoder 8 detects the address of "its" repeater in the data stream of the optical wave guide 10, the instructions connected with the address are passed on to the monitoring unit 17. Within the normal polling cycle, the monitoring unit then sends the operating data in the form of a message via the additional encoder 2 and the digital auxiliary channel of the wave guide 11 to the fault location unit 15 in the line terminal 12.

In addition, it is possible to use a special instruction, which is detected in the monitoring unit 17, for commanding a so-called loop closure. In this case, the monitoring unit of the repeater selected actuates a loop switch 18 which shorts the two opposite data lines inside the repeaters selected, thus forming a closed line loop which starts from the monitoring line terminal. In this manner, the individual sections of the transmission system can be successively checked for their viability from the line terminal.

Analogously to the repeater 13 of FIG. 5, the monitored line terminal 14 of FIG. 6 is also equipped with a monitoring unit 17 and a loop switch 18 which have the same functions as in a repeater.

According to a preferred embodiment of the system, both line terminals 12 and 14 are of identical construction, that is to say the line terminal 12 of FIG. 4 also contains a monitoring unit and a loop switch which can be selected and actuated from the other line terminal 14.

For this purpose, the other line terminal 14 is also equipped with a fault location unit so that the remote monitoring of the transmission system can be carried out with equal priority and optionally from each of the line terminals 12 and 14.

Correspondingly, the repeaters 13 according to FIG. 5 are in this embodiment equipped with another monitoring unit 17', another loop switch 18' and another additional encoder 2' and additional decoder 8' which are drawn in dashed lines in the Figure.

Figure 7:
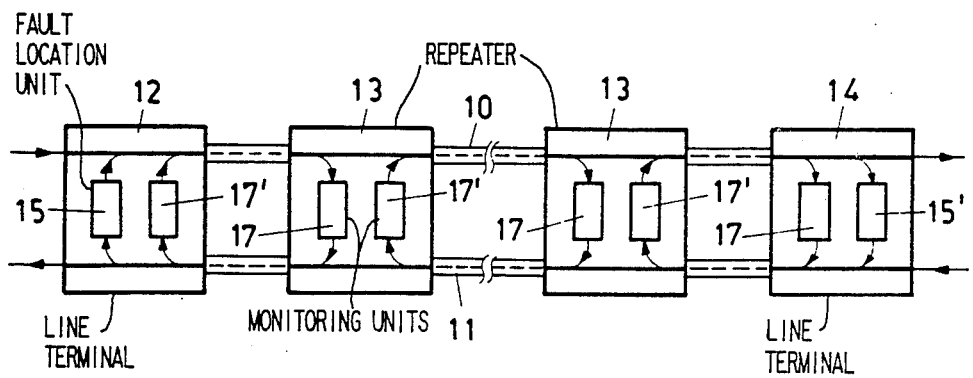
FIG. 7 is a schematic block diagram of a two-way remote monitoring system in an optical wave guide system with application of the method according to the invention.

The various loops of the data streams for a double-sided remote monitoring of the type described are shown in FIG. 7. In one monitoring mode, the fault location unit 15 of the one line terminal 12 operates in conjunction with all monitoring units 17 in the repeaters 13 and of the "passive" monitored line terminal 14.

The fault location unit 15' of the other line terminal operates in conjunction with all monitoring units 17' in the repeaters 13 and the line terminal 12 which is passive in this case.

Overall, the method according to the invention creates the possibility of transferring, with comparatively small effort and on the basis of digital engineering, telemetry data via a digital auxiliary channel in an optical wave guide system and, in this manner, achieves effective remote monitoring without interruption of operations.

Obviously, numerous modifications and variations of the present invention are possible in light of the above teachings. It is therefore to be understood that within the scope of the appended claims, the invention may be practiced otherwise than as specifically described.

LIST OF DESIGNATIONS

1: Line encoder
2, 2': Additional encoder
3: Optical transmitter
4: Optical receiver
5: Reconverter
6: Line decoder
7, 9: Temporary memory
8, 8': Additional decoder
10, 11: Optical wave guide
12, 14: Line terminal
13: Repeater
15, 15': Fault location unit
16: Input and output unit
17, 17': Monitoring unit
18, 18': Loop switch
19: Regenerator circuit

What is claimed as new and desired to be secured by Letters Patent of the United States is:

1. A method for transmitting information items via a digital auxiliary channel in an optical wave guide system for digital signal transmission, in which system electric signals, which are coded in a pseudoternary bipolar code, are converted into a data stream formed by a redundant, binary line code and are transmitted in converted form by an optical transmitter via an optical wave guide to an optical receiver, and in which method in each case one information unit of the information items is transmitted by modification of a selected bit pattern from the data stream thereby to establish said digital auxiliary channel, comprising:
  selecting a HDB-3 code for use as said pseudoternary bipolar code;
  using a MCMI code as said line code;
  using the bit sequences 110011 and 001100 as selected bit patterns;
  allocating at least one of the bit sequences 011011, 100111 and 101101 as a first modification to the bit sequence 110011; and
  allocating at least one of the bit sequences 001001, 000110 and 010010 as a second modification to the bit sequence 001100; and
  transmitting a binary "1" of said information items by means of one of said two modifications; and
  transmitting a binary "0" of said information items by means of the other of said two modifications.

2. A method according to claim 1, comprising:
  storing the information items in each case in a temporary memory before and after transmission via the digital auxiliary channel.

3. A method according to claim 1, as applied to remote monitoring of an optical transmission system in which data are transmitted in opposite directions between two line terminals each including one said optical transmitter and one said optical receiver via at least two optical wave guides and in which damping losses within the path of the optical wave guides are compensated by at least one repeater arranged in the path of the optical wave guides, comprising:
  selecting the at least one repeater by means of at least one of the line terminals via the digital auxiliary channel in the optical wave guide; and
  sending information items regarding operation of the selected repeater back to the line terminal which selected the selected repeater via the digital auxiliary channel in the other optical wave guide.

4. A method according to claim 3, comprising:
  forming the digital auxiliary channel such that an encoder is arranged before the optical transmitter and a decoder is arranged after the optical receiver.

5. A method according to claim 3, comprising:
  allocating an address to each repeater;
  providing a fault location unit in at least one line terminal;
  cyclically and successively selecting all repeaters by direct addressing thereof using said fault location unit; and
  sending by means of each selected repeater incoming operational data, alarm signals and error messages back to the selecting fault locating unit in the form of a message.

6. A method according to claim 5, comprising:
  allocating an address to another line terminal which does not have a fault location unit; and
  cyclically selecting and polling said another line terminal, together with the at least one repeater.

7. A method according to claim 5, comprising:
  associating the fault location unit with an input and output unit from which remote monitoring is initiated; and
  displaying at the input and output unit incoming information concerning operation of the system.

8. A method according to claim 5, comprising:
  providing both line terminals with a respective fault location unit and providing each repeater with two monitoring units; and
  carrying out remote monitoring alternately from the two fault location units, in each case only one of the monitoring units of each repeater being selected and polled by one of the fault location units.

9. A method according to claim 8, comprising:
  providing a monitoring unit in each line terminal; and
  selecting and polling during the monitoring process the monitoring unit of one line terminal by the respective other line terminal.

10. A method according to claim 9, comprising:
  providing loop switches in the line terminals and the repeaters; and
  using the loop switches to short circuit, section by section, the main transmission paths of the two optical wave guides.

* * * * *